United States Patent
Ide et al.

[11] Patent Number: 6,018,952
[45] Date of Patent: Feb. 1, 2000

[54] METHOD FOR CHARGING REFRIGERANT BLEND

[75] Inventors: Satoshi Ide; Tatsumi Tsuchiya, both of Settsu, Japan

[73] Assignee: Daikin Industries, Ltd., Osaka, Japan

[21] Appl. No.: 08/750,718

[22] PCT Filed: Apr. 15, 1996

[86] PCT No.: PCT/JP96/01008

§ 371 Date: Mar. 18, 1997

§ 102(e) Date: Mar. 18, 1997

[87] PCT Pub. No.: WO96/33377

PCT Pub. Date: Oct. 24, 1996

[30] Foreign Application Priority Data

Apr. 18, 1995 [JP] Japan .................. 7-092865

[51] Int. Cl.[7] ............................. F25B 45/00
[52] U.S. Cl. .................. 62/77; 62/114; 62/174; 62/149
[58] Field of Search ............... 252/67; 62/114, 62/174, 149, 77

[56] References Cited

U.S. PATENT DOCUMENTS

| | | | |
|---|---|---|---|
| 5,262,077 | 11/1993 | Bivens et al. | 252/67 |
| 5,277,834 | 1/1994 | Bivens et al. | 252/67 |
| 5,616,276 | 4/1997 | Bivens et al. | 252/67 |
| 5,635,099 | 6/1997 | Bivens et al. | 252/67 |
| 5,736,063 | 4/1998 | Richard et al. | 252/67 |

FOREIGN PATENT DOCUMENTS

| | | |
|---|---|---|
| 0 451 692 A2 | 10/1991 | European Pat. Off. . |
| 0 626 434 A2 | 11/1994 | European Pat. Off. . |
| WO 92/11339 | 7/1992 | WIPO . |

*Primary Examiner*—Henry Bennett
*Assistant Examiner*—Mark Shulman
*Attorney, Agent, or Firm*—Larson & Taylor

[57] ABSTRACT

The present invention provides A method for charging a refrigerant blend, when using as a refrigerant a non-azeotropic blend whose permissible range falls within 22 to 24% of difluoromethane, 23 to 27% of pentafluoroethane and 50 to 54% of 1,1,1,2-tetrafluoroethane, comprising adjusting a composition of non-azeotropic blend in a feeding container to the level of 23.5 to 24.0% of difluoromethane, 25.5 to 26.0% of pentafluoroethane and 50.0 to 51.0% of 1,1,1,2-tetrafluoroethane, discharging and transferring the non-azeotropic blend from the feeding container in liquid phase into another container in which a refrigerant is used so as to allow the composition change associated with the transfer to fall within the permissible range; and a method for producing a vapor compression refrigerating equipment.

6 Claims, 1 Drawing Sheet

HFC32/HFC125/HFC134a = 23.75±0.25/25.75±0.25/50.5±0.5

1

METHOD FOR CHARGING REFRIGERANT BLEND

TECHNICAL FIELD

The present invention relates to a method for charging a non-azeotropic refrigerant blend comprising 22 to 24% of difluoromethane, 23 to 27% of pentafluoroethane and 50 to 54% of 1,1,1,2-tetrafluoroethane used as a working fluid for vapor compression refrigeration cycle, and to a method for producing a vapor compression refrigerator.

BACKGROUND ART

Vapor compression refrigeration cycle to perform cooling and heating of fluids by the use of state change of materials such as evaporation and condensation has found widespread use for applications such as an air-conditioner, refrigerator, hot-water supplier, etc. A variety of working fluids which are applied for the vapor compression refrigeration cycle, especially fluorocarbon refrigerants, have been developed and practically used. Among the fluids, HCFC22 (monochlorodifluoromethane) is widely used as a refrigerant in a heating and cooling system for air-conditioning.

However, chlorofluorocarbons were found to be responsible for the destruction of the ozone layer when released into the stratosphere and eventually exert seriously adverse effects on the ecosystem including human on the earth. Then, a worldwide agreement calls for the restriction of use and in the future total abolition thereof. Under these circumstances, there is an urgent demand for developing a new refrigerant which has no or little potential to cause the problem of depleting the ozone layer.

As attempts to make up for insufficient performances of a single component refrigerant by the use of mixed refrigerants, many proposals for using non-azeotropic refrigerant blends have recently been raised (e.g., Japanese Unexamined Patent Publication No. 79288/1989, Japanese Examined Patent Publication No. 55942/1994, and Japanese Unexamined Patent Publication No. 287688/1991).

A non-azeotropic mixture causes a composition change during phase change such as evaporation or condensation, because a component having lower boiling point is likely to be evaporated and a component having higher boiling points is likely to be condensed. This tendency of composition change is pronounced in the case of evaporation, i.e., phase change from liquid to vapor, and the tendency is particularly pronounced in the case where the differences of boiling point between components are large. Therefore, when such a non-azeotropic blend is transferred from one container to another, it is common practice to discharge it from liquid phase so as not to arise the phase change. However, even in the case of discharging a refrigerant blend from liquid phase, phase change as much as a few percent occurs in the case where the difference in a boiling point is large between components. This is caused by decrease of pressure and increase of the gaseous space derived from discharging, resulting in evaporation of low-boiling-point components from liquid phase. The composition change, even of a few percent, causes a significant change in performances of refrigerant, and the change not only results in a decrease in capability and efficiency of the refrigerant, but also adversely affects safety of refrigerants such as flammability.

In particular, when using as a refrigerant a non-azeotropic blend comprising 23% of difluoromethane (thereafter referred to as "HFC32"), 25% of pentafluoroethane (thereafter referred to as "HFC125") and 52% of 1,1,1,2-tetrafluoroethane (thereafter referred to as "HFC134a"), which is considered as the most promising substitute for HCFC22, the composition change thereof caused during transfer of the refrigerant from bomb, a feeding container, to an air-conditioner is a serious problem, since ASHRAE STANDARD (1994) establishes the permissible composition range of HFC32(22–24%), HFC125(23–27%) and HFC134a(50–54%).

BRIEF DESCRIPTION OF THE DRAWINGS

In FIG. 1, the graphs (A), (B) and (C) show the results of HFC32, HFC125 and HFC134a, respectively.

DISCLOSURE OF THE INVENTION

Figure 1A:
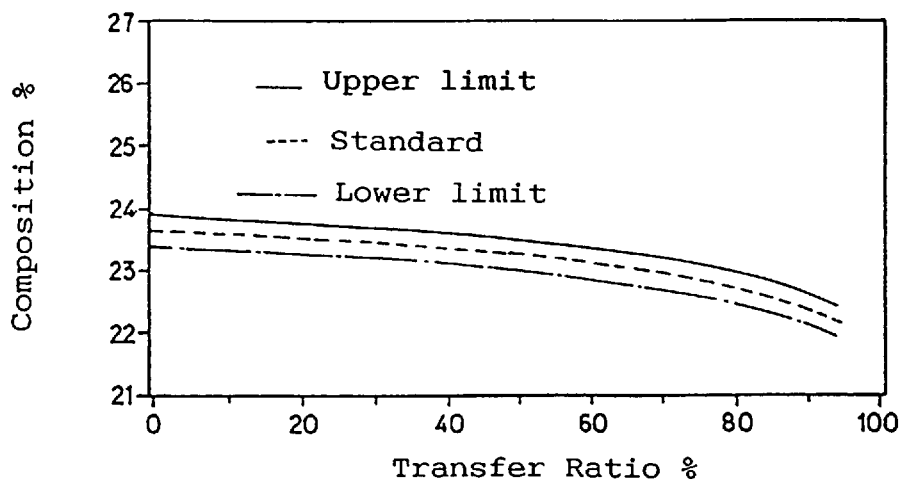
FIG. 1 represents graphs showing the composition change of each component of refrigerant blend, HFC32/HFC125/HFC134a, in liquid phase during transfer of the blend.
Figure 1B:
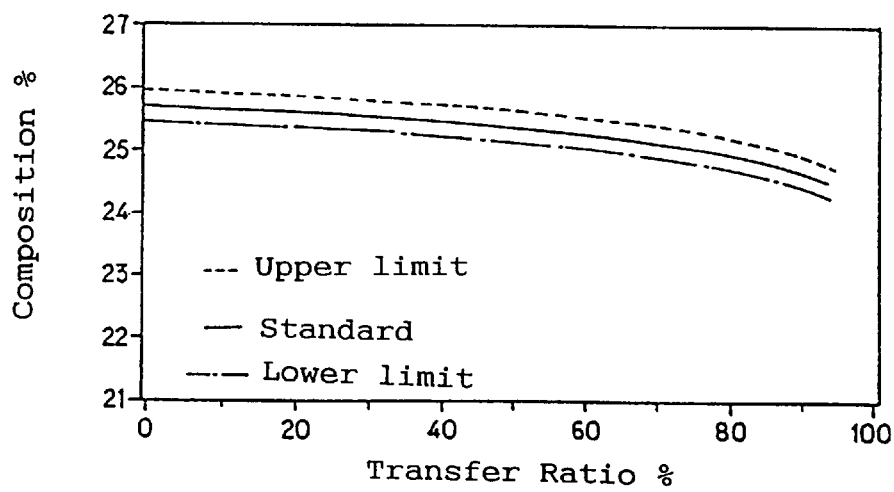
Figure 1C:
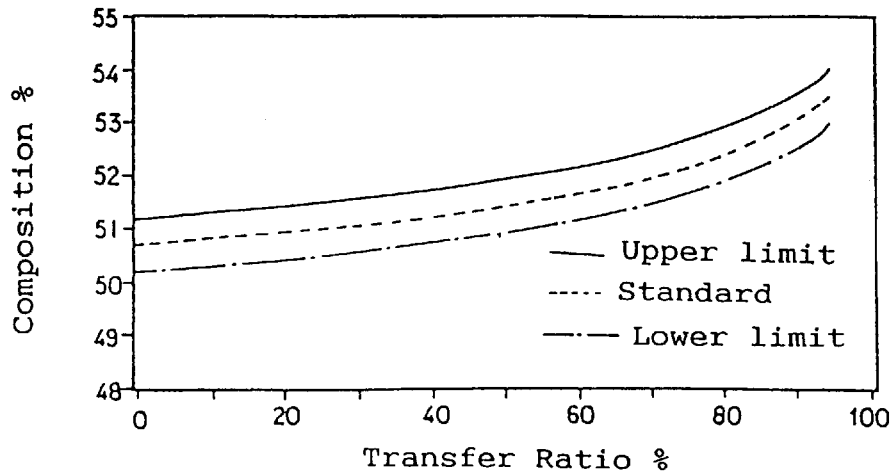

The inventors conducted extensive research on the method for charging a liquid gas so as to solve the problems associated with the composition change which occurs when a non-azeotropic mixture comprising 3 kinds of liquid gases having different boiling points and stored in a sealed vessel is transferred from liquid-containing vessel to another vessel.

As a result, the inventors found a method characterised in that in the case of employing a non-azeotropic mixture comprising 22 to 24% of difluoromethane, 23 to 27% of pentafluoroethane and 50 to 54% of 1,1,1,2-tetrafluoroethane as a refrigerant, composition change associated with the refrigerant transfer falls within the permissible range, by setting the component proportion in a feeding container to the level of 23.5 to 24.0% of difluoromethane, 25.5 to 26.0% of pentafluoroethane and 50.0 to 51.0% of 1,1,1,2-tetrafluoroethane, followed by carrying out the discharge from the liquid phase.

Further, the inventors found a method for producing a vapor compression refrigerating equipment having the composition range of 22 to 24% of difluoromethane, 23 to 27% of pentafluoroethane and 50.0 to 54% of 1,1,1,2-tetrafluoroethane, the method comprising discharging the liquid phase which has the composition of 23.5 to 24.0% of difluoromethane, 25.5 to 26.0% of pentafluoroethane and 50.0 to 51.0% of 1,1,1,2-tetrafluoroethane in a feeding container and transferring it to the main body of the vapor compression refrigerating equipment.

The present invention is directed to a non-azeotropic refrigerant mixture comprising 22 to 24% of difluoromethane, 23 to 27% of pentafluoroethane and 50.0 to 54% of 1,1,1,2-tetrafluoroethane, the concept of the present invention can be applied to other non-azeotropic blends of different composition or blends containing different kinds of liquid gases having different boiling points. For example, a mixture of difluoromethane and 1,1,1,2-tetrafluoroethane, a mixture of pentafluoroethane, 1,1,1,-trifluoroethane and 1,1,1,2-tetrafluoroethane, or the like are exemplified.

Feeding containers according to the present invention are not specifically limited insofar as the container is a sealed container capable of storing a refrigerant blend and, for example, a bomb is exemplified. As equipments to which a refrigerant blend is transferred and charged, any equipment which utilize vapor compression refrigeration cycle can be used. Said equipments include, but are not limited to, an air-conditioner, freezer, refrigerator, hot-water supplier, etc.

The vapor compression refrigerating equipment produced according to the invention comprises refrigerant and the main body of refrigerating equipment, which is not specifically limited to, and any known refrigerating equipment can be used as it is.

EXAMPLES

The present invention is illustrated with reference to the following examples, but it is to be understood that the invention is not limited to the examples unless the scope of the invention is departed from.

Example 1

To a 10 liter sealed container, 9 kg of a non-azeotropic mixture of difluoromethane (HFC32), pentafluoroethane (HFC125) and 1,1,1,2-tetrafluoroethane (HFC134a) was charged in a weight ratio of 23.0/25.0/52.0. The container was placed into a thermostatic chamber and the temperature was maintained at 10° C. or 40° C. The temperature of 40° C. was selected since the Pressurized Gas Control Law prohibits handling containers at a temperature over 40° C., and the composition change increases as the temperature rises. Therefore data obtained at a temperature of 40° C. are considered as the severest in conditions.

The mixture from the liquid phase was then transferred to another empty container at a rate of 900 g/min by means of a pump. A portion of the charging gas was withdrawn through a sampling valve located on a charging pipe near the liquid phase and the composition was analyzed by gas chromatography. The results are shown in Table 1.

TABLE 1

Transfer Ratio and Analysis of Collected Gas Composition

| | Composition (wt %) | | | | | |
|---|---|---|---|---|---|---|
| | 10° C. | | | 40° C. | | |
| Transfer Ratio (%) | HFC32 | HFC125 | HFC134a | HFC32 | HFC125 | HFC134a |
| 10 | 22.9 | 24.9 | 52.2 | 22.8 | 24.9 | 52.3 |
| 20 | 22.9 | 24.9 | 52.2 | 22.8 | 24.8 | 52.4 |
| 30 | 22.8 | 24.8 | 52.4 | 22.7 | 24.8 | 52.5 |
| 40 | 22.8 | 24.8 | 52.4 | 22.6 | 24.7 | 52.7 |
| 50 | 22.7 | 24.8 | 52.5 | 22.5 | 24.6 | 52.9 |
| 60 | 22.7 | 24.7 | 52.6 | 22.3 | 24.5 | 53.2 |
| 70 | 22.6 | 24.7 | 52.7 | 22.2 | 24.4 | 53.4 |
| 80 | 22.5 | 24.6 | 52.9 | <u>21.9</u> | 24.2 | 53.9 |
| 90 | 22.3 | 24.4 | 53.3 | <u>21.6</u> | 23.9 | <u>54.5</u> |

As indicated above, the composition change is larger at a higher temperature. Under conditions of temperature of 40° C. and the transferred proportion over 80%, the content of HFC32 falls outside the permissible range, revealing that only 70 percent of charged refrigerant can be used.

Example 2

Transfer of charged gas was carried out by changing the proportions of components to the following; as for HFC32, composition mean value was changed to 23.75%, permissible lower limit and permissible upper limit in products were changed to 23.5% and 24.0%, respectively; as for HFC125, composition mean value (25.75%), lower limit (25.5%) and upper limit (26.0%), respectively; and as for HFC134a, composition mean value (50.5%), lower limit (50.0%) and upper limit (51.0%), respectively. The temperature of the thermostatic chamber is held at 40° C., which is the severest temperature condition. The results are shown in Table 2.

TABLE 2

Transferred Ratio and Analysis of the Collected Gas Composition according to the Present Invention

| | Composition (wt %) | | | | | |
|---|---|---|---|---|---|---|
| | Lower limit | | | Upper limit | | |
| Transfer Ratio (%) | HFC32 | HFC125 | HFC134a | HFC32 | HFC125 | HFC134a |
| 10 | 23.3 | 25.4 | 51.3 | 23.8 | 25.9 | 50.3 |
| 20 | 23.3 | 25.3 | 51.4 | 23.8 | 25.8 | 50.4 |
| 30 | 23.2 | 25.3 | 51.6 | 23.7 | 25.8 | 50.5 |
| 40 | 23.1 | 25.2 | 51.7 | 23.6 | 25.7 | 50.7 |
| 50 | 23.0 | 25.1 | 51.9 | 23.5 | 25.6 | 50.9 |
| 60 | 22.8 | 25.0 | 52.2 | 23.3 | 25.5 | 51.2 |
| 70 | 22.7 | 24.9 | 52.5 | 23.2 | 25.4 | 52.4 |
| 80 | 22.4 | 24.7 | 52.9 | 22.9 | 25.2 | 51.9 |
| 90 | 22.1 | 24.4 | 53.5 | 22.6 | 24.9 | 52.5 |

As is apparent from the results of said examples, the present invention makes it possible to fall the composition change associated with the transfer within the permissible range. Thus, a novel method for charging a non-azeotropic refrigerant mixture which makes it possible to use the whole amount of the refrigerant transferred is found.

The composition change arisen during transfer of a non-azeotropic refrigerant blend, HFC32/HFC125/HFC134a, used as a working fluid for vapor compression refrigeration cycle falls within the permissible range, whereby a decrease in performances and an increase in flammability of refrigerant can be prevented.

We claim:

1. A method for charging a refrigerant blend, when using as a refrigerant a non-azeotropic blend whose permissible range falls within 22 to 24% of difluoromethane, 23 to 27% of pentafluoroethane and 50 to 54% of 1,1,1,2-tetrafluoroethane, comprising adjusting a composition of non-azeotropic blend in a feeding container to the level of 23.5 to 24.0% of difluoromethane, 25.5 to 26.0% of pentafluoroethane and 50.0 to 51.0% of 1,1,1,2-tetrafluoroethane, discharging and transferring the non-azeotropic blend from the feeding container in liquid phase into another container in which a refrigerant is used so as to allow the composition change associated with the transfer to fall within the permissible range.

2. A method for producing a vapor compression refrigerating equipment having a composition range of 22 to 24% of difluoromethane, 23 to 27% of pentafluoroethane and 50 to 54% of 1,1,1,2-tetrafluoroethane, comprising discharging the liquid phase in a feeding container which has a composition range of 23.5 to 24.0% of difluoromethane, 25.5 to 26.0% of pentafluoroethane and 50.0 to 51.0% of 1,1,1,2-tetrafluoroethane and transferring it to a main body of a vapor compression refrigerating equipment.

3. The method according to claim 2, wherein the vapor compression refrigerating equipment is an air-conditioner.

4. The method according to claim 2, wherein the vapor compression refrigerating equipment is a freezing chamber.

5. The method according to claim 2, wherein the vapor compression refrigerating equipment is a refrigerator.

6. The method according to claim 2, wherein the vapor compression refrigerating equipment is a hot-water supplier.

* * * * *